J. S. & T. B. ATTERBURY.
MANUFACTURE OF HOLLOW GLASSWARE.
No. 3,556. Reissued July 20, 1869.
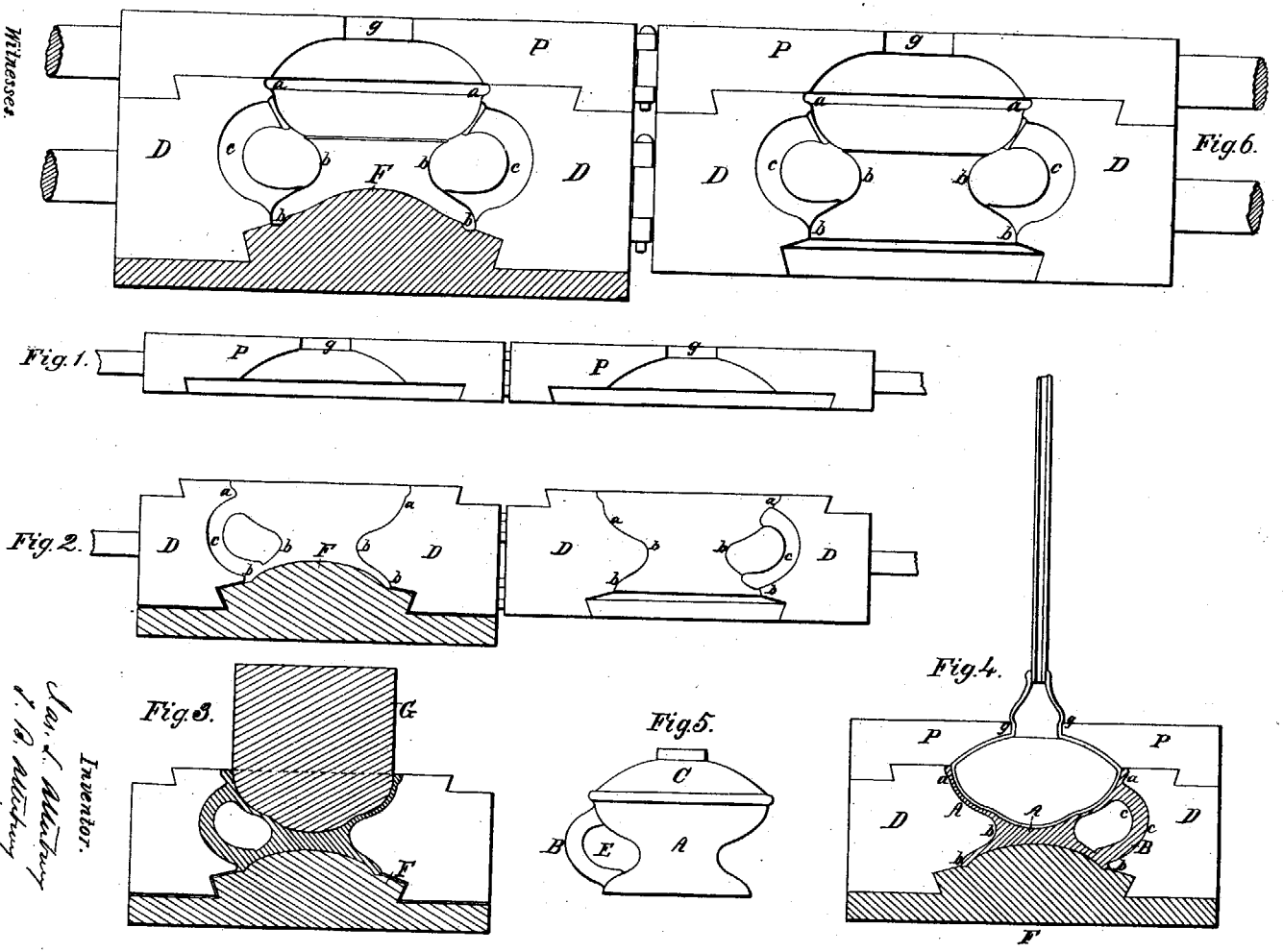
Witnesses.
R. T. Campbell
L. N. Campbell
Inventor.
Jas. L. Atterbury
T. B. Atterbury
by
Mason, Fenwick & Lawrence
THE NORRIS PETERS CO., PHOTO-LITHO., WASHINGTON, D. C.

United States Patent Office.

J. S. ATTERBURY AND T. B. ATTERBURY, OF PITTSBURG, PENNSYLVANIA, FOR THEMSELVES, AND ASSIGNEES OF JAMES REDDICK.

*Letters Patent No.* 35,429, *dated June* 3, 1862; *reissue No.* 3,556, *dated July* 20, 1869.

DIVISION B.

IMPROVEMENT IN THE MANUFACTURE OF HOLLOW GLASS-WARE.

The Schedule referred to in these Letters Patent and making part of the same

*To all whom it may concern:*

Be it known that J. S. ATTERBURY, JAMES REDDICK, and T. B. ATTERBURY, of Pittsburg, in the county of Allegheny, and State of Pennsylvania, did invent an Improvement in the Manufacture of Glass Lamps, for which Letters Patent No. 35,429 were issued to them, on the 3d day of June, 1862, and that the entire interest of the said James Reddick in said invention has been assigned to us, as will appear by reference to the records of the United States Patent Office, liber X[10], page 300, of Transfers of Patents; and we do hereby declare that the following is a more full, clear, and exact description thereof, embraced in this division, marked B, reference being had to the accompanying drawings, making a part of this specification, in which—

Figure 1 is a view of the upper sectional portion of the mould.

Figure 2 is a view of the body of the mould in which the base and handle of the improved lamp are produced.

Figure 3 shows the body of the mould, and base thereof, with a plunger in the act of pressing glass therein, to form a cup, or base, and handle, in one piece.

Figure 4 shows the mode of producing the bowl, or oil-reservoir, in the pressed base.

Figure 5 shows a lamp complete, having a handle united to its body and base portion.

Similar letters of reference indicate corresponding parts in the several figures.

The invention embraced in this patent relates particularly to an improvement in the manufacture of glass lamps with handles.

It is chiefly designed to remedy the objections attending the formation and attachment of handles to these lamps by hand-labor, by providing for the production of lamps, with handles formed upon them, by moulding or casting.

Provision is also made for constructing the base or lower portion of a lamp, and its handle, in a mould, and in one piece, in such manner as to form a substantial base-support for the bowl of the lamp, which is by a subsequent operation formed upon such base and handle, all as will be hereinafter explained.

In the schedule annexed to division "A" of this reissue of our Letters Patent, numbered 35,429, we illustrated and described a method of producing *bas-relief* ornaments upon hollow glass-ware, by first casting and pressing glass in a mould to form the said ornaments, and then, after removing the internal-core section of the mould, the body, or bowl of the article, was produced by blowing glass within the ornamental portion.

In this manner a lamp without a handle was produced, having a pressed base and ornamental portion united to a blown bowl or "peg."

Under this division, B, we shall describe our mode of producing a handle-lamp, having a pressed base and a blown bowl, the handle being produced in the act of casting or pressing the base, and the base being so formed, with a concave seat for receiving the bowl, as to serve as a firm support for the latter.

The following is a description of one practical mode of producing lamps with handles.

In the accompanying drawings, we have represented our improved lamp, and also shown the mould which is adapted for producing this lamp.

We have also represented the base portion of the lamp and the handle as being made of colored glass, with a white-glass bowl, or oil-reservoir, applied to the same, but we do not confine ourselves, under this division, to a mode of ornamenting lamps, and therefore the color of the glass used in their manufacture is optional.

The lamp consists of a cup, or concave base, A, a handle, B, and a bowl, or oil-reservoir, C.

The base portion and handle are formed in one piece of glass, at one operation of casting in a mould.

The mould in which this portion of the lamp is produced consists of sections, or halves D D, made exactly alike, and hinged together, so that they can be opened for removing the article when cast.

The sections of this mould, when brought together, form a matrix, corresponding in shape and size to the external shape and size of the base and handle of the lamp.

*a* represents that portion of the matrix in which the concave-seat for the bowl is produced;

*b b*, the matrix in which the contracted neck and flaring stand are produced; and

*c* is the matrix in which the handle is produced.

It will be seen that the handle B is connected to the concave seat portion, and also to the stand portion, thereby making this handle serve as a means for strengthening the contracted neck between the seat and stand, and at the same time allowing the space E to be utilized for receiving the finger in the act of handling the lamp.

In conjunction with the sections D D, a base piece, F, is used to reduce the thickness and weight of the stand portion of the concave seat.

The central convex portion of this base piece will produce a corresponding concave recess in the bottom of the stand.

To produce the concave base A, with its handle B, the mould sections D, and their base sections F are put together, as shown in fig. 3, and adjusted in proper position in a glass-manufacturer's press, as is usual in making ordinary articles of glass-ware.

The plunger G, which is applied to the follower of the press, is now adjusted for being lowered into the hemispherical chamber of the mould, and, just before it is depressed, melted glass is put into the mould, and immediately thereafter the plunger G is forcibly brought down upon the heated glass, which forces the glass into every part of the matrix, including the handle part, and thus produces the concave base, with handle attached.

The plunger is then removed, and two-part top section of the mould applied to the sections D D, to receive and give shape to the bowl during the process of forming it.

The top section P of the mould, like the intermediate sections, is made in two vertical halves, centrally divided, and hinged together, as shown in fig. 1, so that the halves can be readily applied to and removed from the intermediate section.

The blower gathers sufficient glass on the end of his punty, or blow-pipe, and forms it into a suitable shape to blow a lamp-bowl. This ready, the two-part top section P is opened, and the prepared lump of glass is placed within it, and on the concave surface of the glass base A, previously formed.

The top section is now closed and fastened, when the blower blows through his punty, (which passes through the orifice *g*,) and thus expands the glass, and forms a bowl or reservoir, C, which is at the same time attached to the concave base A.

It will be seen from the above description that we first produce a base and handle of one piece of glass, and at one operation, adapted for receiving and forming a substantial base-support for the bowl of the lamp. We then form upon this base-support the bowl of the lamp, by blowing the glass as described.

A lamp with a handle, can, in this manner, be produced at less cost, and with greater facility, than by the old process, and, when thus produced, it will be much stronger and neater in appearance than a lamp made in the old way.

Lamp-bowls, or pegs, and other articles with two handles, may be, and have as readily been produced, as articles having no projecting part, or only one projecting part; that is, by simply duplicating the handle-matrix *c*, as illustrated in fig. 6, sheet 2, articles with two handles, or projecting parts, just alike, will be produced without any change in the process or operation.

Having described one practical mode of producing lamps with handles,

What we claim as our invention, and desire to secure by Letters Patent, is—

The combination of a cast or pressed base A, a cast or pressed handle, B, and a blown bowl, C, substantially as described.

J. S. ATTERBURY.
T. B. ATTERBURY.

Witnesses:
A. P. NORTON,
A. B. STEVENSON.